United States Patent
Wu

(10) Patent No.: US 10,172,027 B2
(45) Date of Patent: Jan. 1, 2019

(54) DEVICE AND METHOD OF REPORTING A WLAN CONNECTION STATUS

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 26 days.

(21) Appl. No.: 15/653,538

(22) Filed: Jul. 19, 2017

(65) Prior Publication Data

US 2018/0027438 A1 Jan. 25, 2018

Related U.S. Application Data

(60) Provisional application No. 62/363,857, filed on Jul. 19, 2016.

(51) Int. Cl.
| | |
|---|---|
| H04W 24/10 | (2009.01) |
| H04W 92/02 | (2009.01) |
| H04W 76/11 | (2018.01) |
| H04W 76/16 | (2018.01) |
| H04W 84/12 | (2009.01) |
| H04W 76/18 | (2018.01) |
| H04W 76/10 | (2018.01) |

(52) U.S. Cl.
CPC .......... H04W 24/10 (2013.01); H04W 76/11 (2018.02); H04W 76/16 (2018.02); H04W 92/02 (2013.01); H04W 76/10 (2018.02); H04W 76/18 (2018.02); H04W 84/12 (2013.01)

(58) Field of Classification Search
CPC .................................................. H04W 24/10
See application file for complete search history.

(56) References Cited

U.S. PATENT DOCUMENTS 9,491,686 B2 * 11/2016 Bosch ................... H04W 40/36
2006/0130136 A1 * 6/2006 Devarapalli ........ H04L 12/4633
726/15

(Continued)

OTHER PUBLICATIONS

3GPP TS 36.331 V13.2.0, Jun. 2016.

*Primary Examiner* — Raj Jain
*Assistant Examiner* — Andrew C Lee
(74) *Attorney, Agent, or Firm* — Winston Hsu

(57) ABSTRACT

A communication device for reporting a wireless local area network (WLAN) connection status in a wireless communication system comprises a storage device for storing instructions and a processing circuit coupled to the storage device. The processing circuit is configured to execute the instructions stored in the storage device. The instructions comprise establishing a cellular connection to a base station (BS) of a cellular network via a cell of the BS; receiving a first Cellular-WLAN Radio Level Integration with Internet Protocol Security (IPsec) Tunnel (CWIP) configuration configuring a first IP address, a first Internet Key Exchange (IKE) identity and a first counter value for establishing a first IPsec tunnel over a WLAN, on the cellular connection from the BS; and transmitting a first WLANConnectionStatusReport message on the cellular connection to the BS, when the communication device has a WLAN connection with the WLAN, wherein the first WLANConnectionStatusReport message indicates "successfulAssociation".

16 Claims, 4 Drawing Sheets

(56) References Cited

U.S. PATENT DOCUMENTS

| | | | |
|---|---|---|---|
| 2007/0297378 A1* | 12/2007 | Poyhonen | H04W 48/18 370/338 |
| 2008/0076392 A1* | 3/2008 | Khetawat | H04L 63/123 455/411 |
| 2008/0098467 A1* | 4/2008 | Miller | H04W 76/10 726/5 |
| 2009/0316672 A1* | 12/2009 | Balasubramanian | H04L 63/0428 370/338 |
| 2012/0135719 A1* | 5/2012 | Haughn | G06F 8/65 455/414.1 |
| 2012/0190364 A1* | 7/2012 | Wu | H04W 24/10 455/436 |
| 2016/0174191 A1* | 6/2016 | Singh | H04W 68/12 370/329 |
| 2016/0183085 A1* | 6/2016 | Yerrabommanahalli | H04W 12/04 713/153 |

* cited by examiner

DEVICE AND METHOD OF REPORTING A WLAN CONNECTION STATUS

CROSS REFERENCE TO RELATED APPLICATIONS

This application claims the benefit of U.S. Provisional Application No. 62/363,857, filed on Jul. 19, 2016, which is incorporated herein by reference.

BACKGROUND OF THE INVENTION

1. Field of the Invention

The present invention relates to a device and a method used in a wireless communication system, and more particularly, to a device and a method of reporting a wireless local area network (WLAN) connection status in a wireless communication system.

2. Description of the Prior Art

3rd Generation Partnership Project (3GPP) defines long-term evolution (LTE)/wireless location area network (WLAN) Radio Level Integration with Internet Protocol Security (IPsec) Tunnel (LWIP) which supports aggregation of data received from the LTE transmission and the WLAN transmission in an Internet Protocol (IP) layer. That is, the evolved Node-B (eNB) transmits/receives data via the LTE communication and the WLAN communication to/from the user equipment (UE). The eNB may or may not be collocated with the WLAN. How to report a WLAN connection status to a LTE network is an important problem to be solved.

SUMMARY OF THE INVENTION

The present invention therefore provides a communication device and method for reporting a WLAN connection status in a wireless communication system to solve the abovementioned problem.

A communication device for reporting a wireless local area network (WLAN) connection status in a wireless communication system comprises a storage device for storing instructions and a processing circuit coupled to the storage device. The processing circuit is configured to execute the instructions stored in the storage device. The instructions comprise establishing a cellular connection to a base station (BS) of a cellular network via a cell of the BS; receiving a first Cellular-WLAN Radio Level Integration with Internet Protocol Security (IPsec) Tunnel (CWIP) configuration configuring a first IP address, a first Internet Key Exchange (IKE) identity and a first counter value for establishing a first IPsec tunnel over a WLAN, on the cellular connection from the BS; transmitting a first WLANConnectionStatusReport message on the cellular connection to the BS, when the communication device has a WLAN connection with the WLAN, wherein the first WLANConnectionStatusReport message indicates "successfulAssociation"; receiving a second CWIP configuration configuring at least one of a second IP address, a second IKE identity and a second counter value for establishing a second IPsec tunnel, on the cellular connection from the BS, after establishing the first IPsec tunnel over the WLAN; and transmitting a second WLANConnectionStatusReport message on the cellular connection to the BS, when applying all of the at least one of the second IP address, the second IKE identity and the second counter value to successfully establish a second IPsec tunnel, wherein the second WLANConnectionStatusReport message indicates "successfulAssociation".

A communication device for reporting a wireless local area network (WLAN) connection status in the communication device in a wireless communication system comprises a storage device for storing instructions and a processing circuit coupled to the storage device. The processing circuit is configured to execute the instructions stored in the storage device. The instructions comprise establishing a cellular connection to a base station (BS) of a cellular network via a cell of the BS; receiving a Cellular-WLAN Radio Level Integration with Internet Protocol Security (IPsec) Tunnel (CWIP) configuration configuring a first IP address, an Internet Key Exchange (IKE) identity and a counter value for establishing a IPsec tunnel over a WLAN, on the cellular connection from the BS; and transmitting a WLANConnectionStatusReport message on the cellular connection to the BS, when the communication device has a WLAN connection with the WLAN and successfully establishes the IPsec tunnel according to the first IP address, the first IKE identity and the first counter value, wherein the WLANConnectionStatusReport message indicates "successfulAssociation".

These and other objectives of the present invention will no doubt become obvious to those of ordinary skill in the art after reading the following detailed description of the preferred embodiment that is illustrated in the various figures and drawings.

DETAILED DESCRIPTION

Figure 1:
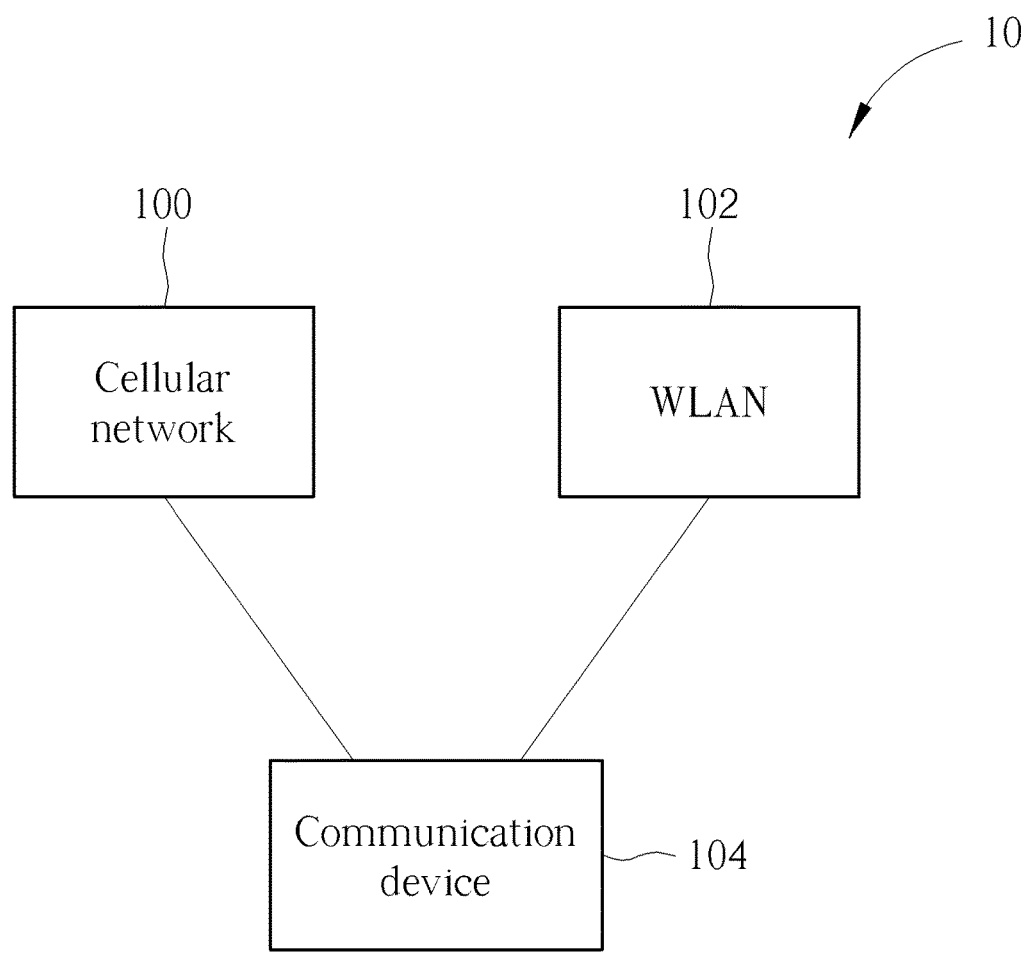
FIG. 1 is a schematic diagram of a wireless communication system according to an example of the present invention.

FIG. 1 is a schematic diagram of a wireless communication system 10 according to an example of the present invention. The wireless communication system 10 is briefly composed of a cellular network 100, a wireless local area network (WLAN) 102 and a communication device 104. Practically, the cellular network 100 may be an evolved UTRAN (E-UTRAN) comprising at least one evolved NB (eNB) and/or at least one relay. In another example, the cellular network 100 may be a fifth generation (5G) network including at least one 5G eNB which employs orthogonal frequency-division multiplexing (OFDM) and/or non-OFDM, and a transmission time interval (TTI) for communicating with the communication devices is smaller than 1 millisecond (ms). In general, a base station (BS) is used to refer any of the eNB and the 5G eNB. In one example, a WLAN standard operated by the WLAN may include IEEE 802.11ac, 802.11n, 802.11g, 802.11b and 802.11a. The WLAN may operate in 2.4 GHz or 5 GHz band, but is not limited herein.

When the communication device 104 has a radio resource control (RRC) connection with an eNB of the cellular network 100 via a cell of the eNB, the communication device 104 receives a first RRCConnectionReconfiguration message from the eNB via the RRC connection, wherein the first RRCConnectionReconfiguration message configures the communication device 104 to perform a LTE/WLAN Radio Level Integration with Internet Protocol Security (IPsec) Tunnel (LWIP) with the eNB and the WLAN 102. The WLAN 102 may be configured by the first RRCConnectionReconfiguration message. The first RRCConnectionReconfiguration message may include at least one WLAN identifier (e.g., service set identifier (SSID), basic SSID (BSSID) and/or homogenous extended SSID (HESSID)) which identifies the WLAN. The first RRCConnectionReconfiguration message may include a LWIP tunnel configuration which includes three parameters: a first IP address, a first Internet Key Exchange (IKE) identity and a first counter value. The first IP address indicates a first LWIP security gateway (LWIP-SeGW) IP address to be used by the communication device 104 for initiating an IPsec tunnel establishment. The first IKE identity is used by the communication device 104 in a first IKE Authentication Procedure with a LWIP-SeGW. The first counter value is used by the communication device 104 to computes security keys used in the IPsec tunnel establishment.

When the communication device 104 connects to the WLAN 102, the communication device 104 transmits a first WLANConnectionStatusReport indicating "successfulAssociation" on the RRC connection to the eNB. When the eNB receives the first WLANConnectionStatusReport, the eNB starts transmitting IP packet (s) to the communication device 104 via the LWIP-SeGW and the WLAN 102. Later, the cellular network 100 may change one parameter of the first IP address, the first IKE identity and the first counter value. For example, the communication device 104 receives a second counter value from the cellular network 100. The communication device 104 initiates the IPsec tunnel establishment by using the second counter value via the WLAN 102 with the LWIP-SeGW. For another example, the communication device 104 receives a second IP address indicating a second LWIP-SeGW IP address from the cellular network 100. The communication device 104 initiates the IPsec tunnel establishment using the second IP address via the WLAN 102 with the LWIP-SeGW.

The communication device 104 can be a user equipment (UE), a mobile phone, a laptop, a tablet computer, an electronic book, a portable computer system, a vehicle or aircraft. In addition, the cellular network 100 (or the WLAN 102) and the communication device 104 can be seen as a transmitter or a receiver according to direction (i.e., transmission direction), e.g., for an uplink (UL), the communication device 104 is the transmitter and the cellular network 100 (or the WLAN 102) is the receiver, and for a downlink (DL), the cellular network 100 (or the WLAN 102) is the transmitter and the communication device 104 is the receiver.

Figure 2:
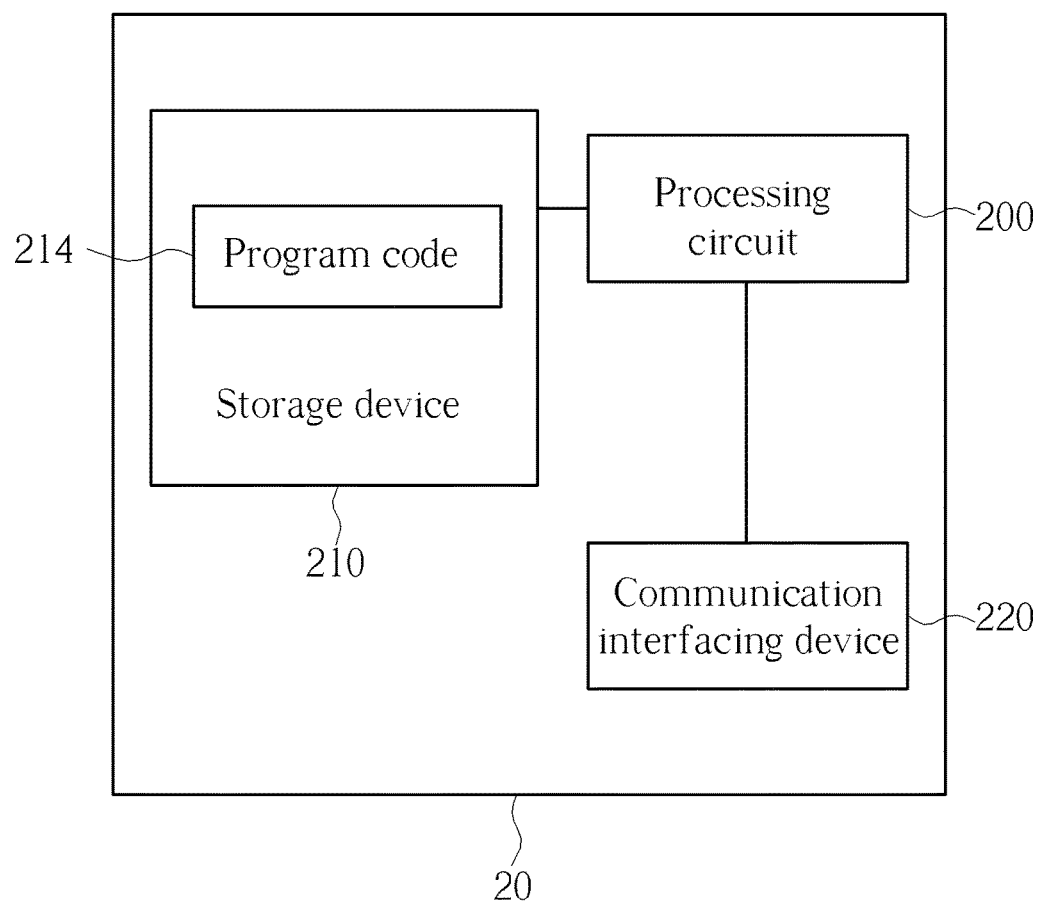
FIG. 2 is a schematic diagram of a communication device according to an example of the present invention.

FIG. 2 is a schematic diagram of a communication device 20 according to an example of the present invention. The communication device 20 may be the communication device 104, the cellular network 100 or the WLAN 102 shown in FIG. 1, but is not limited herein. The communication device 20 may include a processing circuit 200 such as a microprocessor or Application Specific Integrated Circuit, a storage device 210 and a communication interfacing device 220. The storage device 210 may be any data storage device that may store a program code 214, accessed and executed by the processing circuit 200. Examples of the storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The communication interfacing device 220 includes a transceiver and is used to transmit and receive signals (e.g., data, messages and/or packets) according to processing results of the processing circuit 200.

In the following embodiments, a UE is used to represent the communication device 104 in FIG. 1, to simplify the illustration of the embodiments.

Figure 3:
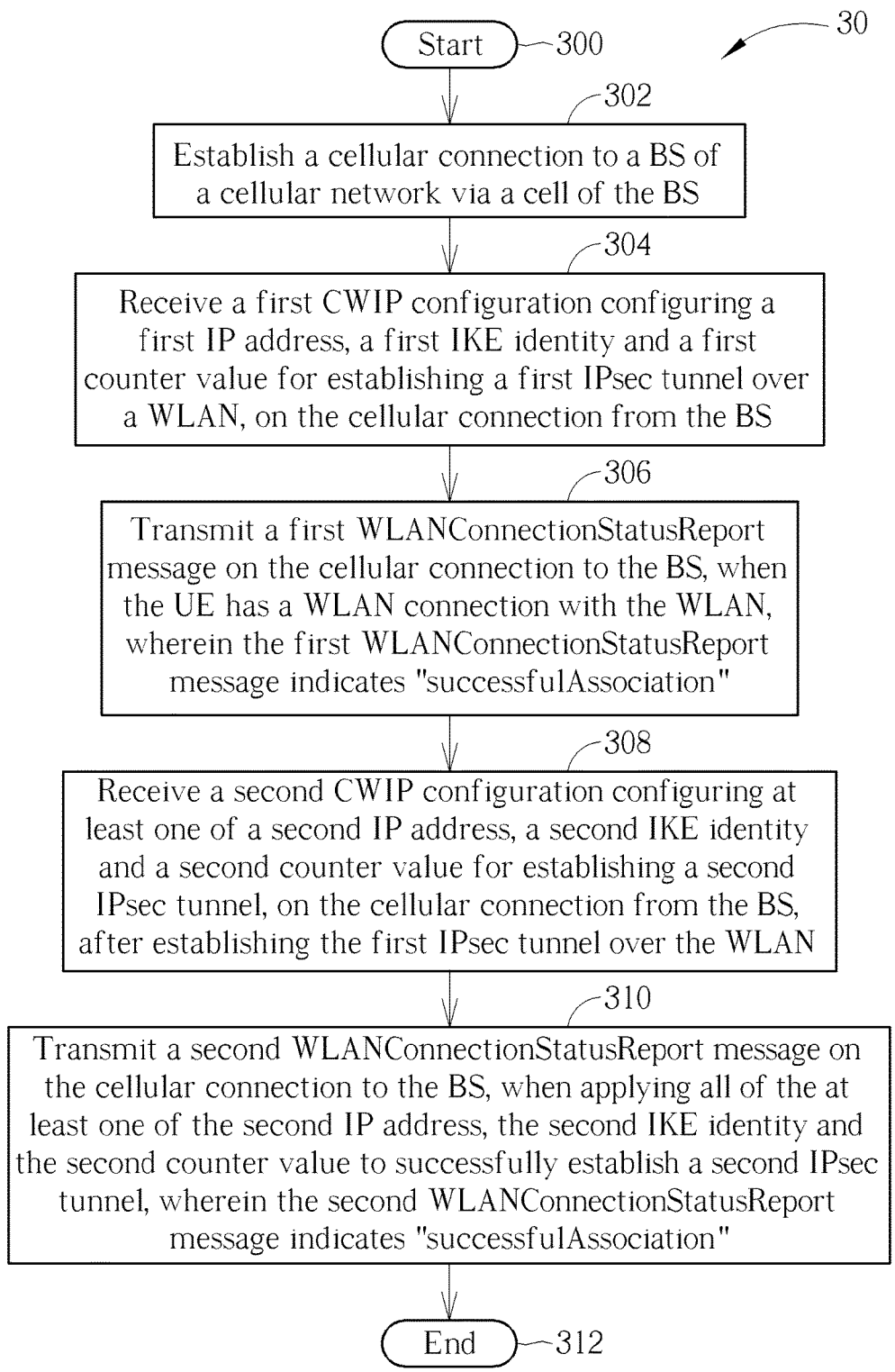
FIG. 3 is a flowchart of a process according to an example of the present invention.

FIG. 3 is a flowchart of a process 30 according to an example of the present invention. The process 30 may be utilized in a UE (e.g., the communication device 104). The process 30 includes the following steps:

Step 300: Start.

Step 302: Establish a cellular connection to a BS of a cellular network via a cell of the BS.

Step 304: Receive a first Cellular-WLAN Radio Level Integration with IPsec Tunnel (CWIP) configuration configuring a first IP address, a first IKE identity and a first counter value for establishing a first IPsec tunnel over a WLAN, on the cellular connection from the BS.

Step 306: Transmit a first WLANConnectionStatusReport message on the cellular connection to the BS, when the UE has a WLAN connection with the WLAN, wherein the first WLANConnectionStatusReport message indicates "successfulAssociation".

Step 308: Receive a second CWIP configuration configuring at least one of a second IP address, a second IKE identity and a second counter value for establishing a second IPsec tunnel, on the cellular connection from the BS, after establishing the first IPsec tunnel over the WLAN.

Step 310: Transmit a second WLANConnectionStatusReport message on the cellular connection to the BS, when applying all of the at least one of the second IP address, the second IKE identity and the second counter value to successfully establish a second IPsec tunnel, wherein the second WLANConnectionStatusReport message indicates "successfulAssociation".

Step 312: End.

According to the process 30, the UE establishes a cellular connection to a BS of a cellular network (e.g., the cellular network 100) via a cell of the BS. The UE receives a first CWIP configuration configuring a first IP address (of a first security gateway), a first IKE identity and a first counter value for establishing a first IPsec tunnel over a WLAN (e.g., the WLAN 102), on the cellular connection from the BS. The UE transmits a first WLANConnectionStatusReport message on the cellular connection to the BS, when the UE has a WLAN connection with the WLAN, wherein the first WLANConnectionStatusReport message indicates "successfulAssociation". After transmitting and/or receiving a plurality of IP packets over the first IPsec tunnel, the UE receives a second CWIP configuration configuring at least one of a second IP address (of a second security gateway), a second IKE identity and a second counter value for establishing a second IPsec tunnel, on the cellular connection from the BS, after establishing the first IPsec tunnel over the WLAN. That is, the UE receives the second CWIP configuration configuring the at least one of the second IP address, the second IKE identity and the second counter value when the UE has established the first IPsec tunnel over the WLAN. The BS transmits the second CWIP configuration, because the first IPsec tunnel has been used for a long time. Then, the UE establishes the second IPsec tunnel (or called reestablishes the first IPsec tunnel) via the WLAN using all of the at least one of the second IP address, the second IKE identity and the second counter value.

The UE transmits a second WLANConnectionStatusReport message on the cellular connection to the BS, when applying all of the at least one of the second IP address, the second IKE identity and the second counter value to successfully establish a second IPsec tunnel, wherein the second WLANConnectionStatusReport message indicates "successfulAssociation". Further, The UE transmits the second WLANConnectionStatusReport message on the cellular connection to the BS, when successfully establishing the second IPsec tunnel, wherein the second WLANConnectionStatusReport message indicates "successfulAssociation". That is, the UE transmits the second WLANConnectionStatusReport message indicating "successfulAssociation", when the UE successfully establishes the second IPsec tunnel. In other words, the UE does not indicate "successfulAssociation" to the BS, if the UE has not successfully established the second IPsec tunnel. It should be noted that the UE may not transmit a WLANConnectionStatusReport message indicating a WLAN connection failure when applying the second CWIP configuration, since the UE has the WLAN connection with the WLAN.

Realization of the process 30 is not limited to the above description. The following examples may be applied to the process 30.

In one example, the UE transmits the first WLANConnectionStatusReport message on the cellular connection to the BS, when the UE has the WLAN connection with the WLAN and successfully establishes the first IPsec tunnel over the WLAN according to the first IP address, the first IKE identity and the first counter value. That is, the UE transmits the first WLANConnectionStatusReport message indicating "successfulAssociation", when the UE successfully establishes the first IPsec tunnel. In other words, the UE does not indicate "successfulAssociation" to the BS, if the UE has not successfully established the first IPsec tunnel. If the UE transmits the first WLANConnectionStatusReport message when the UE has the WLAN connection (i.e. successfully perform an association with the WLAN) before successfully establishing the first IPsec tunnel, the BS may start transmitting IP packets to a security gateway (e.g., LWIP-SeGW) for the UE. However, the security gateway (e.g., LWIP-SeGW) may drop the IP packets since the security gateway (e.g., LWIP-SeGW) has no IPsec tunnel established with the UE. In one example, the UE transmits a third WLANConnectionStatusReport message indicating a failure to the BS, when failing to establish the first IPsec tunnel over the WLAN. The failure may be "failureWlanUnavailable", "failureWlanRadioLink", or "failureTimeout". In one example, the UE receives the second CWIP configuration configuring the at least one of the second IP address, the second IKE identity and the second counter value, when the UE has established the first IPsec tunnel over the WLAN to a security gateway.

In one example, the UE receives a third IP address from the cellular network via a cellular communication, before receiving the first CWIP configuration. The UE establishes the first IPsec tunnel over the WLAN connection to the first IP address by using a fourth IP address according to a first Internet KEP Version 2 (IKEv2) handshake procedure, when having the cellular connection. The UE receives the fourth IP address from the WLAN (e.g., the fourth IP address is assign by a Dynamic Host Configuration Protocol (DHCP) server to the UE), and uses the fourth IP address for communication on the WLAN. The UE generates a first IP packet, and sets a source IP address in a first IP header of the first IP packet to the third IP address. The UE transmits the first IP packet over the first IPsec tunnel, when having the cellular connection to use the CWIP. In one example of transmitting the first IP packet over the first IPsec tunnel, the UE encapsulates the first IP packet into a second IP packet. The UE sets a source IP address in a second IP header of the second IP packet to the fourth IP address, and a destination IP address in the second IP header of the second IP packet is the first IP address. The second IP header may include an authentication header (AH) or an encapsulating security payload (ESP). The UE establishes the second IPsec tunnel over the WLAN connection to the second IP address by using the fourth IP address according to a second IKEv2 handshake procedure, when having the cellular connection.

In one example, the UE transmits the second WLANConnectionStatusReport message on the cellular connection to the BS, after updating the first counter value (e.g., lwipCounter) to the second counter value (e.g., lwip-Counter).

In one example, the UE transmits the second WLANConnectionStatusReport message on the cellular connection to the BS, after updating the first IP address to the second IP address. The UE may update to the second IP address by establishing the second IPsec tunnel using the second IP address to the second security gateway (e.g., LWIP-SeGW) via the WLAN.

In one example, in addition to the fourth IP address, a CWIP configuration may include a WLAN identity (e.g., SSID, BSSID, or HESSID) of the WLAN. In one example, the UE establishes the second IPsec tunnel to a first security gateway according to a second pre-shared key, if the second CWIP configuration includes the second counter value but does not include the second IP address. In one example, the UE establishes the second IPsec tunnel to a second security gateway according to a first pre-shared key, if the second CWIP configuration includes the second IP address but does not include the second counter value. In one example, the UE establishes the second IPsec tunnel to a second security gateway according to a second pre-shared key, if the second CWIP configuration includes the second IP address and the second counter value. The first pre-shared key is derived according to the first counter value and a key $K_{eNB}$. The second pre-shared key is derived according to the second counter value and the key $K_{eNB}$.

Figure 4:
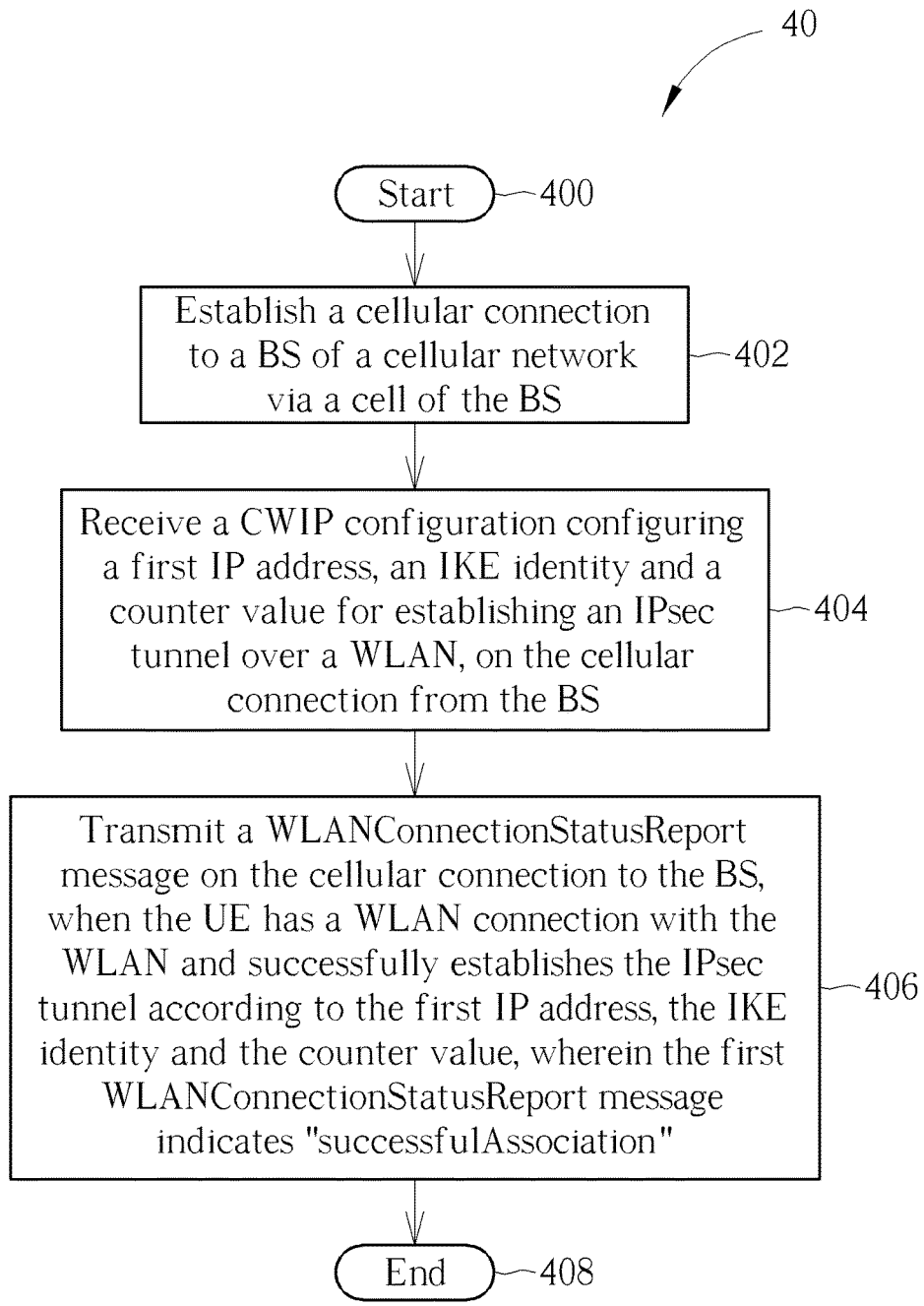
FIG. 4 is a flowchart of a process according to an example of the present invention.

FIG. 4 is a flowchart of a process 40 according to an example of the present invention. The process 40 may be utilized in a UE (e.g., the communication device 104). The process 40 includes the following steps:

Step 400: Start.

Step 402: Establish a cellular connection to a BS of a cellular network via a cell of the BS.

Step 404: Receive a Cellular-WLAN Radio Level Integration with IPsec Tunnel (CWIP) configuration configuring a first IP address, an IKE identity and a counter value for establishing an IPsec tunnel over a WLAN, on the cellular connection from the BS.

Step 406: Transmit a WLANConnectionStatusReport message on the cellular connection to the BS, when the UE has a WLAN connection with the WLAN and successfully establishes the IPsec tunnel according to the first IP address, the IKE identity and the counter value, wherein the first WLANConnectionStatusReport message indicates "successfulAssociation".

Step 408: End.

According to the process 40, the UE establishes a cellular connection to a BS of a cellular network (e.g., the cellular network 100) via a cell of the BS. The UE receives a CWIP configuration configuring a first IP address, an IKE identity and a counter value for establishing an IPsec tunnel over a WLAN (e.g., the WLAN 102), on the cellular connection from the BS. The UE transmits a WLANConnectionStatusReport message on the cellular connection to the BS, when the UE has a WLAN connection with the WLAN and successfully establishes the IPsec tunnel according to the first IP address, the IKE identity and the counter value, wherein the first WLANConnectionStatusReport message indicates "successfulAssociation". That is, the UE transmits the WLANConnectionStatusReport message indicating "successfulAssociation", when the UE successfully establishes the first IPsec tunnel. In other words, the UE does not indicate "successfulAssociation" to the BS, if the UE has not successfully established first IPsec tunnel.

Realization of the process 40 is not limited to the above description. The following examples may be applied to the processes 30 and 40.

In one example, the cellular connection is a LTE connection or a 5G connection (e.g., a radio link, a RRC connection, etc.). The LTE connection and the 5G connection include that the UE has a Cell Radio Network Temporary Identifier (C-RNTI) configured by the BS to communicate with the BS. The LTE connection includes a RRC connection, or comprises the RRC connection and a data radio bearer (DRB). In one example, the CWIP configuration is a LWIP configuration (e.g., lwip-configuration) or a 5G/WLAN Radio Level Integrations with IPsec Tunnel (5GWIP). In one example, the UE receives a second IP address from the cellular network (e.g., a Mobility Management Entity (MME)) over the RRC connection in a Non-Access-Stratum (NAS) message (e.g., an ACTIVATE DEFAULT EPS BEARER CONTEXT ACCEPT message transmitted by the MME in response to a Packet Data Network (PDN) Connectivity Request transmitted by the UE to request establishing a PDN connection) or over the DRB (in a DHCP message). Then, the UE receives a RRC message comprising a LWIP configuration. The UE performs an association procedure to connect to the WLAN configured by the LWIP configuration. The UE initiates an establishment of the IPsec tunnel. How to configure the C-RNTI, establish the RRC connection and configure the DRB can be referred to the 3GPP specifications and is not narrated herein.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. Any of the above processes and examples above may be compiled into the program code 214.

To sum up, the present invention provides a method and a communication device for reporting WLAN connection status to the BS of the cellular network. Accordingly, the BS of the cellular network knows that the IPsec tunnel has been established. Thus, the problem when the cellular network starts transmitting IP packet(s) to the UE is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A communication device for reporting a wireless local area network (WLAN) connection status in a wireless communication system, comprising:
  a storage device, for storing instructions of:
    establishing a cellular connection to a base station (BS) of a cellular network via a cell of the BS;
    receiving a first Cellular-WLAN Radio Level Integration with Internet Protocol Security (IPsec) Tunnel (CWIP) configuration configuring a first IP address, a first Internet Key Exchange (IKE) identity and a first counter value for establishing a first IPsec tunnel over a WLAN, on the cellular connection from the BS;
    transmitting a first WLANConnectionStatusReport message on the cellular connection to the BS, when the communication device has a WLAN connection with the WLAN, wherein the first WLANConnectionStatusReport message indicates "successfulAssociation";
    receiving a second CWIP configuration configuring at least one of a second IP address, a second IKE identity and a second counter value for establishing a second IPsec tunnel, on the cellular connection from the BS, after establishing the first IPsec tunnel over the WLAN; and
    transmitting a second WLANConnectionStatusReport message on the cellular connection to the BS, when applying all of the at least one of the second IP address, the second IKE identity and the second counter value to successfully establish a second IPsec tunnel, wherein the second WLANConnectionStatusReport message indicates "successfulAssociation"; and
  a processing circuit, coupled to the storage device, configured to execute the instructions stored in the storage device.

2. The communication device of claim 1, wherein the communication device transmits the first WLANConnectionStatusReport message on the cellular connection to the BS, when the communication device has the WLAN connection with the WLAN and successfully establishes the first IPsec tunnel over the WLAN according to the first IP address, the first IKE identity and the first counter value.

3. The communication device of claim 1, wherein the storage device further stores the instruction of:
  transmitting a third WLANConnectionStatusReport message indicating a failure to the BS, when failing to establish the first IPsec tunnel over the WLAN.

4. The communication device of claim 3, wherein the failure is "failureWlanUnavailable", "failureWlanRadioLink", or "failureTimeout".

5. The communication device of claim 1, wherein the communication device receives the second CWIP configuration configuring the at least one of the second IP address, the second IKE identity and the second counter value, when the communication device has established the first IPsec tunnel over the WLAN to a security gateway.

6. The communication device of claim 1, wherein the communication device transmits the second WLANConnectionStatusReport message on the cellular connection to the BS, after updating the first counter value to the second counter value.

7. The communication device of claim 1, wherein the communication device transmits the second WLANConnectionStatusReport message on the cellular connection to the BS, after updating the first IP address to the second IP address.

8. The communication device of claim 1, wherein the storage device further stores the instruction of:

establishing the second IPsec tunnel to a first security gateway according to a second pre-shared key, if the second CWIP configuration comprises the second counter value but does not comprise the second IP address;

wherein the second pre-shared key is derived according to the second counter value and a key $K_{eNB}$.

9. The communication device of claim 1, wherein the storage device further stores the instruction of:

establishing the second IPsec tunnel to a second security gateway according to a first pre-shared key, if the second CWIP configuration comprises the second IP address but does not comprise the second counter value;

wherein the first pre-shared key is derived according to the first counter value and a key $K_{eNB}$.

10. The communication device of claim 1, wherein the storage device further stores the instruction of:

establishing the second IPsec tunnel to a second security gateway according to a second pre-shared key, if the second CWIP configuration comprises the second IP address and the second counter value;

wherein the second pre-shared key is derived according to the second counter value and a key $K_{eNB}$.

11. A communication device for reporting a wireless local area network (WLAN) connection status in a wireless communication system, comprising:

a storage device, for storing instructions of:

establishing a cellular connection to a base station (BS) of a cellular network via a cell of the BS;

receiving a Cellular-WLAN Radio Level Integration with Internet Protocol Security (IPsec) Tunnel (CWIP) configuration configuring a first IP address, an Internet Key Exchange (IKE) identity and a counter value for establishing an IPsec tunnel over a WLAN, on the cellular connection from the BS; and transmitting a WLANConnectionStatusReport message on the cellular connection to the BS, when the communication device has a WLAN connection with the WLAN and successfully establishes the IPsec tunnel according to the first IP address, the IKE identity and the counter value, wherein the WLANConnectionStatusReport message indicates "successfulAssociation"; and a processing circuit, coupled to the storage device, configured to execute the instructions stored in the storage device.

12. The communication device of claim 11, wherein the cellular connection is a LTE connection or a 5G connection.

13. The communication device of claim 12, wherein the LTE connection and the 5G connection comprise that the communication device has a Cell Radio Network Temporary Identifier (C-RNTI) configured by the BS to communicate with the BS.

14. The communication device of claim 12, wherein the LTE connection comprises a radio resource control (RRC) connection, or comprises the RRC connection and a data radio bearer (DRB).

15. The communication device of claim 11, wherein the CWIP configuration is a LTE/WLAN Radio Level Integration with IPsec Tunnel (LWIP) configuration or a 5G/WLAN Radio Level Integration with IPsec Tunnel (5GWIP).

16. The communication device of claim 14, wherein the storage device further stores the instructions of:

receiving a second IP address from the cellular network over the RRC connection in a Non-Access-Stratum (NAS) message or over the DRB;

receiving a radio resource control (RRC) message comprising a LWIP configuration;

performing an association procedure to connect to the WLAN configured by the LWIP configuration; and initiating an establishment of the IPsec tunnel.

* * * * *